though the present invention is especially directed to

United States Patent Office 2,890,171
Patented June 9, 1959

2,890,171

EXTREME HIGH TEMPERATURE GREASE COMPOSITIONS GELLED WITH THERMOSETTING RESIN-COATED GELS

Jack W. Armstrong, Concord, and John A. Edgar, Martinez, Calif., assignors to Shell Development Company, New York, N.Y., a corporation of Delaware No Drawing. Application February 25, 1955
Serial No. 490,695

5 Claims. (Cl. 252—28)

This invention relates to grease compositions and is particularly concerned with the production of greases especially useful not only at ordinary temperatures but also at extremely high operating temperatures and which are, at the same time, resistant to disintegration in the presence of water.

Greases especially designed for operation above the melting points of soaps (which are normally employed for grease forming) have comprised amorphous colloids, such as silica or colloidal natural products such as clay. Since both of these materials are hydrophilic, the presence of water causes the separation of the inorganic gelling agent from the lubricating oil and hence the destruction of the grease consistency. Attempts have been made in the past to provide the gelling agents with hydrophobic properties, such as by the incorporation of a high molecular weight hydrophobic cationic surface-active agent, which is either absorbed upon or reacted with the surface of the inorganic colloid. Other means of stabilizing the greases have been absorption of siloxane films or the surface esterification of acidic colloids such as silica.

Most of these greases are useful only at ordinary operating temperatures such as those encountered in normal automotive equipment and the like. When utilized in the proportions recommended by the art, the greases are not only stable with respect to disintegration in the presence of water, but also have satisfactory thermal stability as long as automotive operating conditions are not exceeded. However, it has been found that when temperatures above about 400° F. are encountered during the use of such greases one or another of the components of the grease decomposes thus resulting in the destruction of the grease composition or in the degradation or elimination of lubricating properties thereof. Several attempts have been made to overcome this instability at elevated operating temperatures, such as by the incorporation of thermoplastic resins as the waterproofing agent. While this improves the operating range to a certain extent, it has been found that such greases are still not capable of operating for any effective length of time at temperatures appreciably above 400° F. Even when utilizing such resins as oil-modified alkyds, high temperature operation has been found to be completely unsatisfactory.

It is an object of the present invention to provide new grease compositions. It is another object of this invention to provide grease compositions especially suitable for operation at extremely high operating temperatures. It is a further object of this invention to provide grease compositions which are not only stable at high temperature but also resistant to disintegration in the presence of water. Other objects will become apparent during the following discussion.

Now, in accordance with the present invention, it has been found that greases exhibiting both high water resistance and excellent thermal stability at extremely high operating temperatures comprise a lubricating oil gelled to a grease consistency with an inorganic grease-forming colloid, said colloid bearing on its surfaces from about 1% to about 20% (based on the weight of the colloid) of a thermosetting resin. Preferably the compositions comprise an organosilicon fluid of lubricating oil viscosity gelled to a grease consistency with a colloidally dispersed clay, the surfaces of said clay bearing waterproofing proportions of a phenoplast.

It will be understood that the essence of the present invention comprises the use of the subject thermosetting resins for the waterproofing of the inorganic gelling agents and, while these compositions are especially useful at extremely high operating temperatures, they may also be employed at ordinary temperatures such as those encountered in automotive operation and the like.

The gelling agents to be employed comprise inorganic colloidal materials having either an amorphous or crystalline structure. The amorphous colloids include especially silica, alumina, magnesia, ferric oxide, nickel sulfide and mixtures thereof, such as silica-magnesia. These may be incorporated in the form of highly oil absorptive gels typified by those obtained with the "aerogel" process, such as described in Kistler patent, U.S. 2,260,625.

They may be prepared, for example, not only by the aerogel process but also by solvent transfer processes wherein a hydrogel is formed and the water eliminated therefrom by displacement with a water miscible solvent such as acetone, the water miscible solvent then being displaced with the lubricating oil to be employed in the final composition.

In place of or in addition to the amorphous colloids, claylike colloids may be employed and this class is preferred due to their relatively inert character at the high operating temperatures which are especially contemplated in this invention. While the clays of low base exchange capacity, such as Georgia clay, attapulgite and the like, may be utilized, it is preferred that a high base exchange clay such as Wyoming bentonite or hectorite be employed. These are preferably prepared by dispersing the crude clay in water to form a hydrosol from which the undesirable gangue is separated by sedimentation or centrifuging. The purified clay hydrosol, preferably containing from 1 to about 10% by weight of clay, is then treated as described more fully hereinafter for the formation of the subject grease compositions.

While the present invention is especially directed to extreme high temperature lubricating greases, they may be employed for normal operating conditions as well. Hence, and especially useful at this operating conditions below about 400° F., any of the well-known lubricating oils may be utilized. These include mineral oil lubricants and synthetic lubricating oils of known types, such as the phosphorus esters, silicon esters and aliphatic esters formed by esterification of aliphatic dicarboxylic acids with monohydric alcohols. Typical species of these materials include tricresylphosphate, dioctylphthalate, bis(2-ethylhexyl)sebacate, tetra(2-ethylhexyl)silicate and the like.

Lubricants to be employed at temperatures in excess of about 400° F. are those having an inherent high thermal stability including the halocarbons and organosilicon fluids. The halocarbons may be those described in Peterson et al. patent, U.S. 2,679,479 and include especially the fluorocarbon oils, preferably distilling above about 200° C., at atmospheric pressure. The most useful class of lubricants for grease compositions to be utilized at temperatures in excess of about 400° F. include the organo-substituted silicon fluids of lubricating oil viscosity. Liquid organo-silicon polymers which are adapted for the preparation of the subject high temperature grease compositions may be obtained by the hydrolysis and chemical condensation of one or more hydrolyzable silicon compounds having the general formula $R_2SiX_2$, wherein R is a lower alkyl radical and X is a hydrolyzable group selected from the class consisting of halogen and alkoxy groups. They may also be obtained by the hydrolysis and chemical condensation of a mixture of alkylated silicon compounds containing at least 75 mol percent of such dialkyl silicon compound having the general formula $R_2SiX_2$ and not more than 25 mol percent of a monoalkyl silicon compound having the formula $RSiX_3$, or a total of not more than 25 mol percent of both such monoalkyl silicon compound and a trialkyl silicon compound having the formula $R_3SiX$. In all of these formulas, R and X have the meanings stated above. In general, the hydrolyzable silicon compound or mixture of such compounds from which the liquid organosilicon polymers may be prepared is one having an average composition corresponding to the formula $R_{4-z}SiX_z$, wherein z is a whole or a fractional number from 2.25 to 1.5 and R and X have the meanings given above.

Examples of hydrolysable dialkyl silicon compounds which may be used in preparing the liquid organo-silicon polymers are dimethyl silicon dichloride, methyl ethyl silicon dichloride, diethyl silicon dichloride, methyl propyl silicon dichloride, dimethyl silicon dibromide, diethyl silicon dibromide, dimethyl-dimethoxy-silicon, diethyldiethoxy-silicon, dimethyl-diethoxy-silicon, etc. Examples of hydrolyzable monoalkyl silicon compounds and the hydrolyzable trialkyl silicon compounds which may be present together with the dialkyl silicon compound in amount not exceeding 25 mol percent of the mixture are methyl silicon trichloride, ethyl silicon tribromide, ethyl silicon trichloride, propyl silicon trichloride, methyl-trimethoxy-silicon, methyl-triethoxy-silicon, ethyl-triethoxy-silicon, trimethyl silicon chloride, trimethyl silicon bromide, triethyl silicon chloride, trimethyl-methoxy-silicon, trimethyl-ethoxy-silicon, triethyl-ethoxy-silicon, etc.

The liquid organo-silicon polymer may be obtained by heating the hydrolyzable silicon compound or compounds with water in the presence of a hydrolysis catalyst, e.g., a mineral acid. Hydrolysis of the silicon compounds to form corresponding organo-silicols (which silicols are unstable under the reaction conditions and in some instances have not been isolated as such) is acccompanied by chemical condensation of the silicols to form the liquid organo-silicone polymer (or co-polymer) product. The starting materials are selected so that the product contains an average of between 1.75 and 4, and preferably between 1.9 and 2.5, atoms of carbon per atom of silicon.

The viscosity of such polymer or co-polymer is, of course, dependent upon the reaction conditions employed in preparing the same, e.g., the polymers of dimethyl silicone vary from thin liquids to viscous liquids to solid resins depending upon the conditions under which they are prepared. It is the liquid polymers and co-polymers having a preferred viscosity exceeding 500 Saybolt seconds at 100° F., which are usually employed in preparing the new compositions and such liquid polymers of dimethyl silicone are preferred.

The thermosetting resins, especially contemplated for use in the present compositions, comprise those derived from aldehydes as one of the resin-forming components. The classes are clearly described in the book entitled "Fundamentals of Plastics," edited by Richardson and Wilson, chapters 5 and 6. The authors of said chapters, Barkhuff et al., regard thermosetting resins as being divided into two broad classes, namely those termed "phenoplasts" and a second class called "aminoplasts."

The most important species within these two broad groups include the thermosetting phenol-formaldehyde resins, the urea-formaldehyde resins and the melamine-formaldehyde resins. However, other phenols and other amines may be copolymerized with a variety of aldehydes. Phenols include resorcinol, the cresols, and lower alkyl phenols, such as tertiary butyl phenol and tertiary amyl phenol. Aldehydes which may be copolymerized with either the phenols or with the amino compounds include formaldehyde, acrolein, furfural, crotonaldehyde and acetaldehyde.

The amino compounds to be utilized together with the aldehyde in addition to or in place of urea and/or melamine include thiourea, aniline, benzene sulfonamide, toluene sulfonamide, alkyl substituted ureas and guanidine. It will be noted by the above classification that other types of resins are excluded from the generic term "thermosetting resin," although it is understood that a number of such materials could be classed either as thermosetting or as thermoplastic. For example, the oil-modified alkyds have certain thermosetting properties but require an unduly long heating period to attain their maximum hardness. Moreover, it has been found that oil-modified alkyds are unsuitable for use in the present invention due apparently to their relatively low thermal stability in the presence of the other grease-forming ingredients as compared with the classes of true thermosetting resins outlined above.

It is preferred that the thermosetting resins be polymerized directly upon the surfaces of the inorganic gelling agent at least in their final stages, although the first stages (wherein solvent soluble products are obtained) may be conveniently conducted separately apart from the gelling agent. The processes for the formation of phenoplasts and aminoplasts are too well known to require description here. In a typical process, suitable for the production of the present compositions, phenol is mixed with a molar excess (1.5 mols) of formaldehyde in the presence of an ammonia catalyst and heated at a temperature of about 210° F., the reaction being stopped while the product is still soluble in acetone. The product, which contains excess formaldehyde, is dehydrated in vacuum, dissolved in acetone and thereafter mixed with a clay alcogel. The clay alcogel is prepared as described hereinbefore by deganguing a clay hydrosol and replacing the water in the hydrosol with alcohol by solvent displacement. Approximately 10% by weight of the phenol-formaldehyde monomer based on a clay is utilized. The organic dispersion of clay and phenol-formaldehyde monomer is diluted with additional acetone and mixed with a dimethylsilicone lubricating oil, ten times as much by weight of oil, based on the clay, being employed. After mixing in a Waring Blendor the composition is heated to remove the solvent and thereafter heated at a temperature of about 450° F. for a period of one to 4 hours. By this means the phenoplast is fully polymerized on the surfaces of the clay. Thereafter the grease ingredients so formed are milled to produce a satisfactory grease structure.

Using similar techniques, suitable greases may be prepared by polymerizing urea and formaldehyde on the surface of a silica gel, preferably employing a molar ratio of formaldehyde to urea between about 1.5:1 and about 2:1. The pH of the polymerization system is preferably between about 5.5 and 8. In preparing this grease a methylphenyl silicone lubricating oil may be utilized.

Suitable greases may be prepared by the polymerization of melamine with furfural on the surface of hectorite clay, said clay being dispersed in acetone after having been prepared initially as a hectorite hydrosol and the acetone utilized to dehydrate the hydrosol and thereby form an organosol. In preparing the melamine-furfural resin, it is preferred that a furfural to melamine molar ratio between about 2:1 to 6:1 be employed, the pH of the system being between about 7.5 and 9.5. While the silicone lubricating oils are employed for the preparation of grease compositions to be used at temperature in excess of about 400° F., these greases may also be composed in their lubricating phase of petroleum lubricants, such as Bright Stock.

In greater detail, the first of the above described greases is prepared as follows: 47 parts by weight of phenol and 59.8 parts by weight of a 38% aqueous solution of formaldehyde, together with 25 parts by weight of concentrated ammonia, are heated at about 210° F., the reaction being stopped while the product is still soluble in acetone. Wyoming bentonite is dispersed in water to form a hydrosol from which the gangue is separated. Ethyl alcohol is used to displace the water from the hydrosol and to form an alcosol of the clay. Fifteen parts by weight of the clay in the form of the alcosol is combined with 1.5 parts by weight of the phenol-formaldehyde monomer and 83.5 parts by weight of a dimethyl silicone lubricating oil in the presence of an excess of acetone. After solvent removal by heating, the mixture is heated for a period of one to two hours at a temperature of about 450° F. in order to complete the polymerization of the phenol-formaldehyde resin on the surfaces of the clay. The product is thereafter milled to produce the subject type of greases.

In order to study the operating characteristics of these greases, a bearing operating at 10,000 r.p.m. and at a temperature of 450° F. is run to freezing or failure otherwise while lubricated with the grease being tested. Under these conditions the above described grease permitted operations for 113 hours. At a test temperature of 400° F., the grease was stable and lubricated properly for at least 790 hours.

Comparisons with other high polymer or resinous coatings were made. A linseed oil-modified alkyd deposited on clay which was then dispersed in a silicone did not form a grease operable at the test temperature of 450° F. apparently due to decomposition of the modified alkyds at these elevated temperatures. Polystyrene deposited on a clay and formed into a grease was unsatisfactory, apparently due to the low melting point of the polystyrene, which is in the order of 220–240° F. Polymerized diallyl-phthalate also was unsatisfactory since it permitted operation for only about 20 hours at the test temperature. Nylon was somewhat better but only gave a test result of 60 hours. In each of the above comparative tests, 10% by weight of the resin or polymer was deposited on the surfaces of a clay and a dimethyl silicone lubricating oil utilized as the lubricant base.

We claim as our invention:

1. A lubricating grease composition consisting essentially of a liquid organo-silicone polymer the organo radicals of which are selected from the group consisting of $C_{1-3}$ alkyl and $C_{1-3}$ oxyalkyl radicals, said polymer being of lubricating oil viscosity thickened to a grease consistency with from about 1% to about 20% by weight of a colloidally dispersed clay, the surfaces of said clay bearing from about 1% to about 20%, based on the weight of the clay, of a thermally resinified thermosetting resin of the group consisting of phenoplasts formed between an aldehyde and a phenol in a phenol:aldehyde molar ratio between 1:1 and 1:1.5 and aminoplasts formed between an amine and an aldehyde in an amine:aldehyde molar ratio between 1:1.5 and 1:6, the solvent-soluble resin being mixed with the clay and oil and thereafter heated in the presence thereof to form the solvent-insoluble resin.

2. A lubricating grease composition consisting essentially of a liquid dimethyl silicone polymer of lubricating oil viscosity thickened to a grease consistency with from about 1% to about 20% by weight of a colloidally dispersed clay, the surfaces of said clay bearing from about 1% to about 20%, based on the weight of the clay, of a thermally resinified thermosetting phenol formaldehyde resin wherein said resin was formed by polymerization of phenol and formaldehyde in phenol:formaldehyde molar ratios between 1:1 and 1:1.5, the solvent-soluble resin being mixed with the clay and oil and thereafter heated in the presence thereof to form the solvent-insoluble resin.

3. A lubricating grease composition consisting essentially of a liquid dimethyl-silicone polymer of lubricating oil viscosity in excess of 500 Saybolt seconds at 100° F. thickened to a grease consistency with from about 1% to about 20% by weight of a colloidally dispersed clay, the surfaces of said clay bearing from about 1% to about 20%, based on the weight of the clay, of a thermally resinified thermosetting phenol formaldehyde resin wherein said resin was formed by polymerization of phenol and formaldehyde in phenol:formaldehyde molar ratios between 1:1 and 1:1.5, the solvent-soluble resin being mixed with the clay and oil and thereafter heated in the presence thereof to form the solvent-insoluble resin.

4. A lubricating grease composition consisting essentially of a liquid dialkyl-silicone polymer of lubricating oil viscosity in excess of 500 Saybolt seconds at 100° F., wherein each alkyl group is a lower alkyl radical containing from 1 to 3 carbon atoms, thickened to a grease consistency with from about 1% to about 20% by weight of a colloidally dispersed clay, the surfaces of said clay bearing from about 1% to about 20%, based on the weight of the clay, of a thermally resinified thermosetting phenol formaldehyde resin wherein said resin was formed by polymerization of phenol and formaldehyde in phenol:formaldehyde molar ratios between 1:1 and 1:1.5, the solvent-soluble resin being mixed with the clay and oil and thereafter heated in the presence thereof to form the solvent-insoluble resin.

5. A lubricating grease composition consisting essentially of a liquid dimethyl-silicone polymer of lubricating oil viscosity thickened to a grease consistency with from about 1% to about 20% by weight of a colloidally dispersed clay, the surfaces of said clay bearing from about 1% to about 20%, based on the weight of the clay, of a thermally resinified thermosetting phenoplast formed between an aldehyde and a phenol in a phenol:aldehyde molar ratio between 1:1 and 1:1.5, the solvent-soluble resin being mixed with the clay and oil and thereafter heated in the presence thereof to form the solvent-insoluble resin.

References Cited in the file of this patent

UNITED STATES PATENTS

| Number | Name | Date |
| --- | --- | --- |
| 2,162,890 | Horne et al. | June 20, 1939 |
| 2,520,720 | Harman | Aug. 29, 1950 |
| 2,554,222 | Stross | May 22, 1951 |
| 2,573,650 | Peterson | Oct. 30, 1951 |
| 2,640,822 | Harman et al. | June 2, 1953 |
| 2,648,633 | Peterson | Aug. 11, 1953 |
| 2,658,869 | Stross | Nov. 10, 1953 |